United States Patent [19]

Nakayama

[11] Patent Number: 5,687,218
[45] Date of Patent: Nov. 11, 1997

[54] CORDLESS TELEPHONE

[75] Inventor: Toru Nakayama, Yokohama, Japan

[73] Assignee: Canon Kabushiki Kaisha, Tokyo, Japan

[21] Appl. No.: 185,228

[22] Filed: Jan. 24, 1994

Related U.S. Application Data

[63] Continuation of Ser. No. 650,610, Feb. 5, 1991, abandoned.

[30] Foreign Application Priority Data

Feb. 15, 1990 [JP] Japan ................... 2-35238
Feb. 16, 1990 [JP] Japan ................... 2-35280

[51] Int. Cl.$^6$ ........................................... H04Q 7/20
[52] U.S. Cl. .................. 379/61; 379/58; 455/54.1
[58] Field of Search .................... 379/61, 62, 58, 379/59, 63; 455/54.1, 54.2

[56] References Cited

U.S. PATENT DOCUMENTS

| | | | |
|---|---|---|---|
| 4,768,218 | 8/1988 | Yorita | 379/61 |
| 4,852,148 | 7/1989 | Shibata et al. | 379/59 |
| 4,879,740 | 11/1989 | Nagashima et al. | 379/61 |
| 4,881,259 | 11/1989 | Scordato | 379/58 |
| 4,882,766 | 11/1989 | Akaiwa | 455/58.2 |
| 4,953,198 | 8/1990 | Daly et al. | 379/63 |
| 5,097,500 | 3/1992 | Itoh | 379/62 |
| 5,101,500 | 3/1992 | Marui | 379/60 |
| 5,123,043 | 6/1992 | Higashiyama et al. | 379/58 X |

OTHER PUBLICATIONS

America Series, Cellular Mobile Telephone by Motorola, Jan. 1989.

*Primary Examiner*—Dwayne Bost
*Assistant Examiner*—William G. Trost
*Attorney, Agent, or Firm*—Fitzpatrick, Cella, Harper & Scinto

[57] ABSTRACT

A cordless telephone connected through a radio line to a master unit enclosing a telephone line comprises: a receiver to receive a radio signal; a memory to store a plurality of ID numbers; and a speaker which rings when the ID number received by the receiver coincides with either one of the ID numbers stored in the memory. The speaker has a display to display the coincident ID number. With the apparatus of the invention, the operator can make a speech of monitor an absence recorded message by a slave unit at a remote position away from the master unit by certainly recognizing the called slave unit through a monitor sound or an indication lamp.

4 Claims, 4 Drawing Sheets

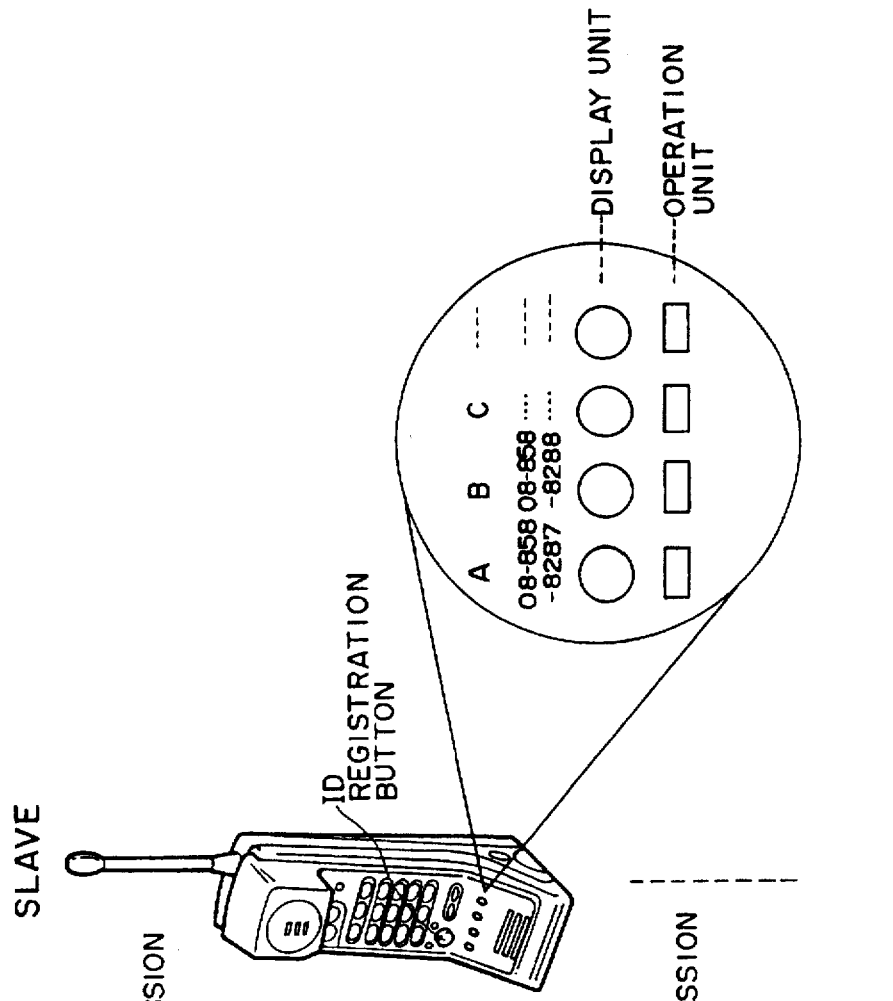
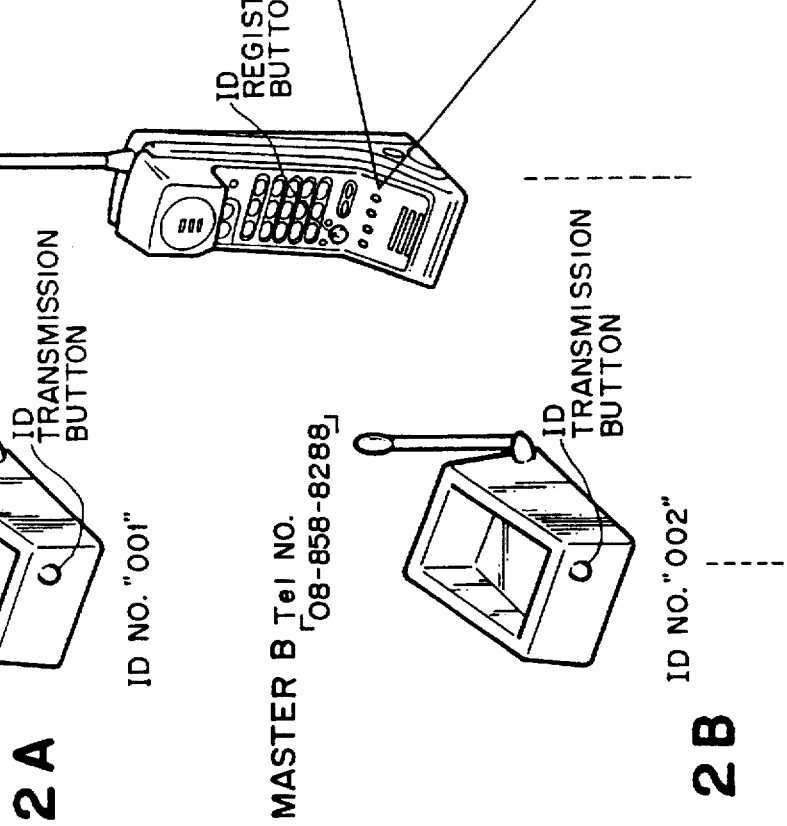
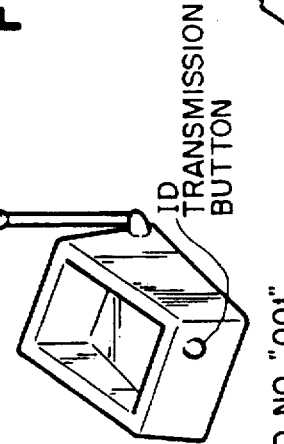
FIG. 2A
FIG. 2B
FIG. 2C

CORDLESS TELEPHONE

This application is a continuation of application Sr. No. 07/650,610 filed Feb. 5, 1991, now abandoned.

BACKGROUND OF THE INVENTION

1. Field of the Invention

The present invention relates to a cordless telephone which is connected to a master unit enclosing a telephone line through a radio line.

2. Related Background Art

Hitherto, a cordless telephone apparatus is constructed by a receiver (slave) and a line connecting unit (master).

However, in the conventional apparatus, in the case where a plurality of master units are arranged at positions away from the slave units, there is a drawback such that when a call is received by any one of the plurality of master units, it is confusing for the responding user as to which of the plurality of slave units correspond to the master units.

On the other hand, in a conventional absence telephone apparatus, an absence recorded message is monitored from the speaker provided in the telephone apparatus main body.

However, in the conventional apparatus, the absence recorded message can be monitored only at the location where the telephone apparatus main body is arranged.

SUMMARY OF THE INVENTION

It is an object of the invention to improve a cordless telephone.

It is another object of the invention is to provide a cordless telephone which can be connected to a plurality of master units.

It is still another object of the invention to provide a cordless telephone which can respond even when a call is received by any one of a plurality of master units.

It is a further another object of the invention to provide a cordless telephone which can perform an originating call through any one of a plurality of master units.

It is yet a further another object Of the invention to provide a cordless telephone which displays any usable one of a plurality of master units.

It is another object of the invention to improve a telephone with a record function.

It is yet another object of the invention to enable a message during the recording to be monitored at a remote position.

It is a still further another object of the invention to enable a recorded message to be reproduced at a remote position.

The above and other objects and features of the present invention will become apparent from the following detailed description and the appended claims with reference to the accompanying drawings.

BRIEF DESCRIPTION OF THE DRAWINGS

FIG. 2A, 2B, 2C are perspective views of a cordless telephone according to the first embodiment of the invention;

DETAILED DESCRIPTION OF THE PREFERRED EMBODIMENTS

Figure 1:
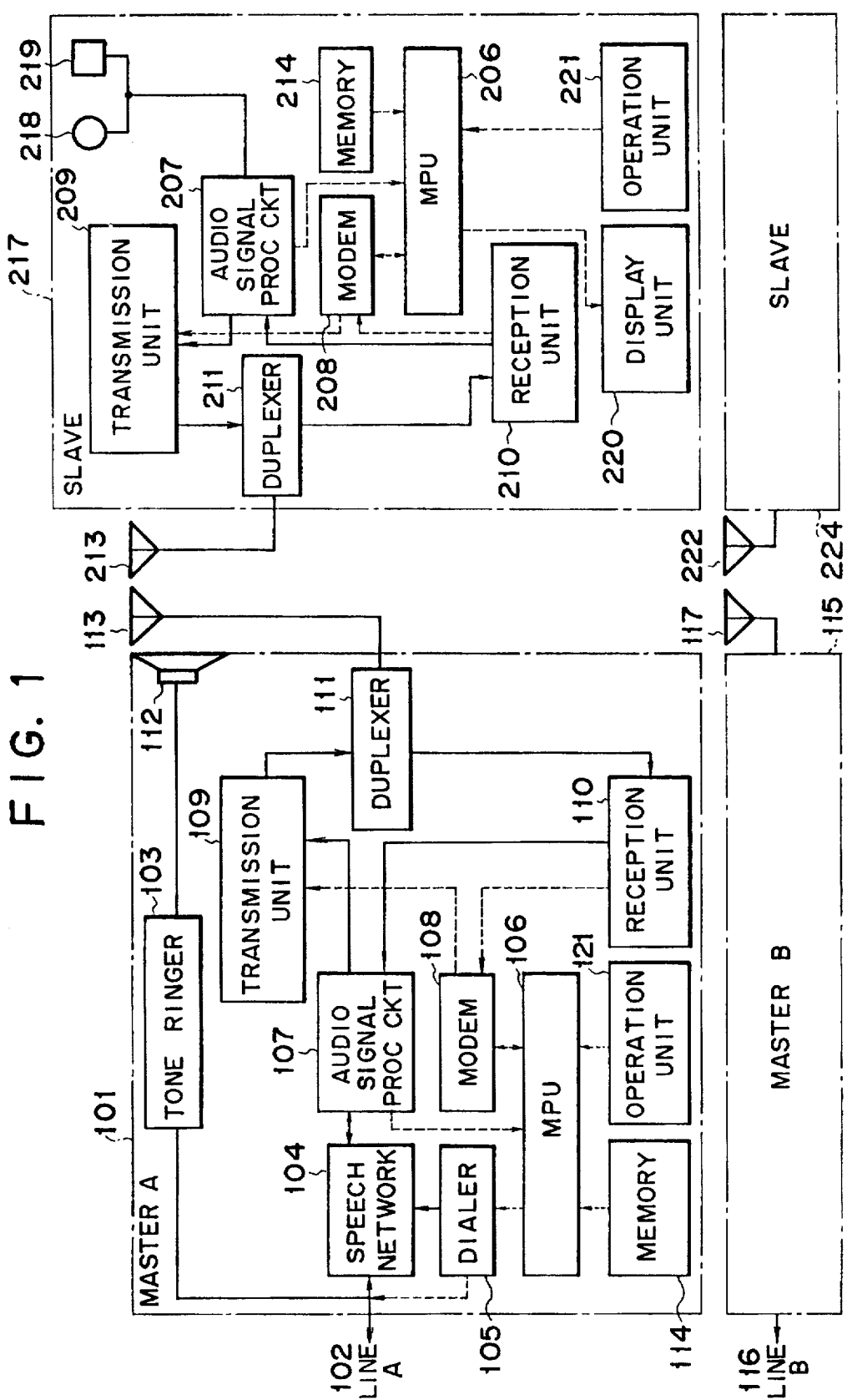
FIG. 1 is a block diagram of a cordless telephone according to the first embodiment of the invention.

FIG. 1 is a block diagram showing a construction of an embodiment of the invention.

According to the embodiment, a slave unit has a memory to store ID numbers of a plurality of master units, thereby enabling a plurality of lines to be received by a single slave unit.

Reference numeral 101 denotes a master A of a cordless telephone; 102 a line A; 103 a tone ringer; 104 a speech network; 105 a dialer; 106 and 206 microprocessing units (MPU) of the master 101 and a slave 217; 107 and 207 audio signal processing circuits; 108 and 208 modems; 109 and 209 transmission units; 110 and 210 reception units; 111 and 211 duplexers; 112 a sounder; 113, 117, 213, and 222 antennas; 114 and 214 memories; 115 a master B; 116 a line B; 217 the slave A; 218 a transmitter; 219 a receiver; 220 a display unit; 121 and 221 operation units; and 224 a slave B.

In the diagram, a solid line indicates an audio signal of the analog system and a broken line indicates a control signal of the digital system.

When an ID (identification number) registration button of the operation unit 221 of the slave 17 is depressed, the MPU 206 of the slave 17 is set into an ID registration standby mode. On the other hand, when an ID transmission button of the operation unit 121 of the master 101 is depressed, the MPU 106 of the master 101 sends an ID. The MPU 206 of the slave 217 registers the received ID into the memory 214, thereby finishing the ID registration of the slave.

On the other hand, when an originating call occurs in the master 101, the MPU 106 sends an ID signal and calls the slave. Upon reception of the ID signal, the MPU 206 of the slave 217 discriminates whether the ID has already been registered or not by checking the content in the memory 214. If YES, the master which sent the ID signal is displayed by the display unit 220.

For instance, assuming that the originating call occurred to the master A, the MPU 206 lights on a lamp corresponding to the master A in the display unit 220 as shown in FIG. 2C.

The operator can know the master to which the originating call occurred by looking at the lit-on lamp and pushes a button in the operation unit 221 corresponding to the lit-on lamp. In the case of the example of FIG. 2C, the operator depresses the button corresponding to the master A. The MPU 206 transmits a code indicative of a response together with an ID signal corresponding to the depressed button.

When the master 101 receives the response code together with the ID signal of the self station, the master connects a radio line with the slave which responded and captures the line 102. Thus, a speech communication can be executed.

As mentioned above, according to the embodiment, the ID numbers of a plurality of masters have previously been stored in the memory 214 in the slave. When a call is received by either one of the masters, the called master calls the slave station by using the ID number of the self station. If the received ID number is included in the ID numbers which have previously been stored in the memory in the slave, one of a plurality of lamps of the display unit 220 corresponding to the received ID number is lit on. Therefore, the operator can know to which master the call occurred.

Further, when the operator depresses a button in the operation unit 221 corresponding to the lit-on lamp, the MPU 206 transmits a response code together with the ID number.

On the other hand, a plurality of masters are off-hooked on the basis of the transmitted response code together with the ID number of the self station and are set into a speech available mode. Therefore, it is possible to respond to any one of the plurality of masters from one slave.

In the case of performing an originating call from the slave, a free available master is selected and the button in the operation unit 221 shown in FIG. 2 is depressed. Thus, the MPU 206 sends an originating call instruction by using the ID number corresponding to the depressed button. The instructed master determines that the originating call is for the self station on the basis of the received ID number, thereby executing an originating call.

The MPUs of the slaves other than the slave which is executing a speech monitor the communications between the other slaves and the master and flicker the lamp corresponding to the master which is executing a speech or light on the lamp in a color different from the color of the lamp of the self station during the speech, thereby enabling the operator to recognize the master which is executing the speech.

Thus, the operator can execute an originating call by selecting the free available master by pushing the button in the operation unit 221.

As described above, according to the embodiment, there is an advantage such that one slave can receive calls from a plurality of masters because the ID numbers of a plurality of masters have been stored in the memory in the slave.

Figure 3:
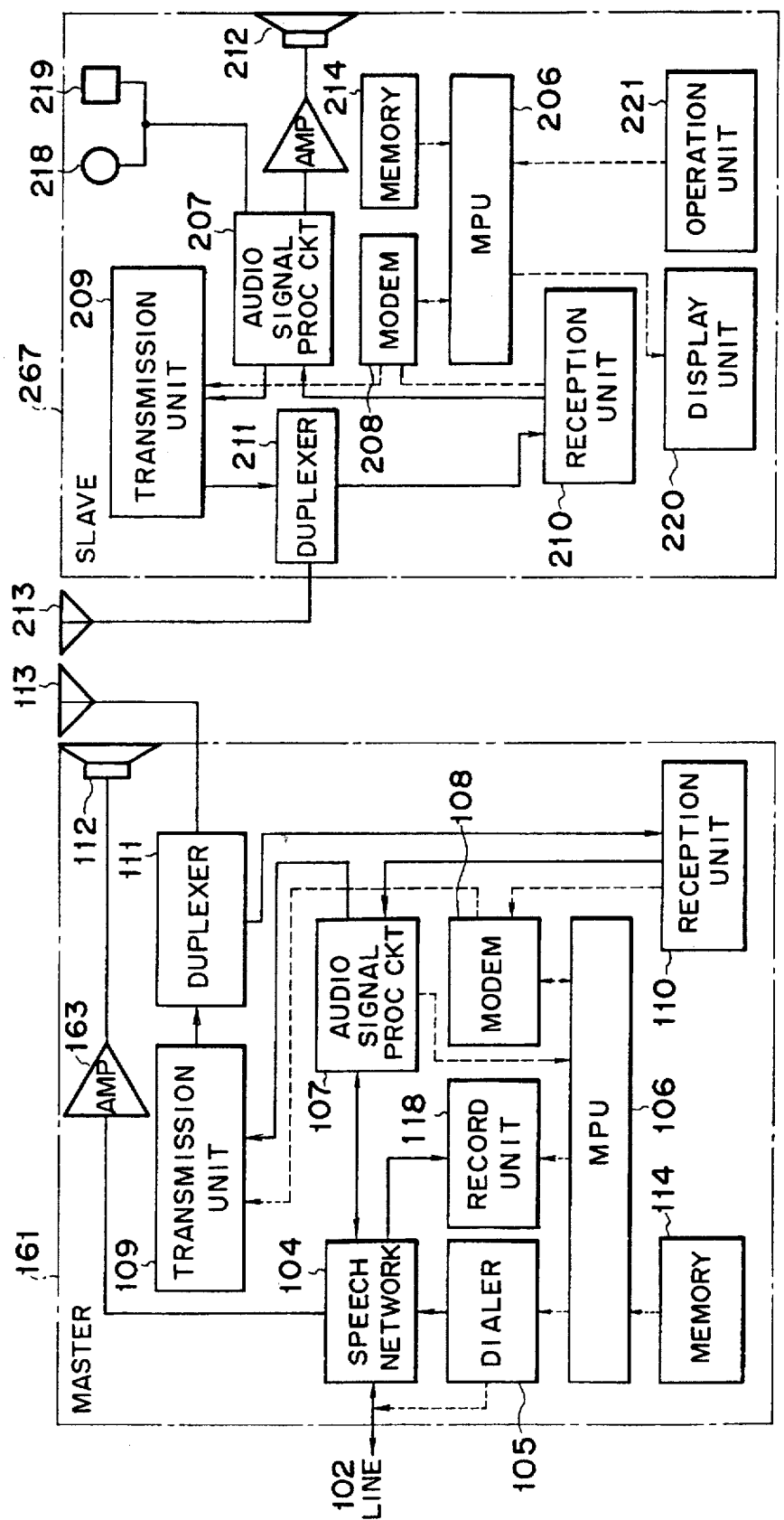
FIG. 3 is a block diagram of a cordless absence telephone according to the second embodiment of the invention.

FIG. 3 shows a construction of the second embodiment of the invention.

According to the second embodiment, an absence monitoring mode is provided for the slave of a cordless telephone, thereby enabling the content of an absence recorded message to be known by the user from the slave side.

Reference numeral 161 denotes a master unit; 102 the line; 163 an amplifier; 104 a speech network; 105 a dialer; 166 and 266 microprocessing units (MPU); 107 and 207 the audio signal processing circuits; 108 and 208 the modems; 109 and 209 the transmission units; 110 and 210 the reception units; 111 and 211 the duplexers; 112 and 212 the speakers; 113 and 213 the antennas; 114 and 214 the memories; 118 a record unit; 267 a slave; 218 the transmitter; 219 the receiver; 220 the display unit; and 221 the operation unit. In FIG. 3, a solid line indicates an audio signal of the analog system and a broken line denotes an audio signal of the digital system.

Figure 4:
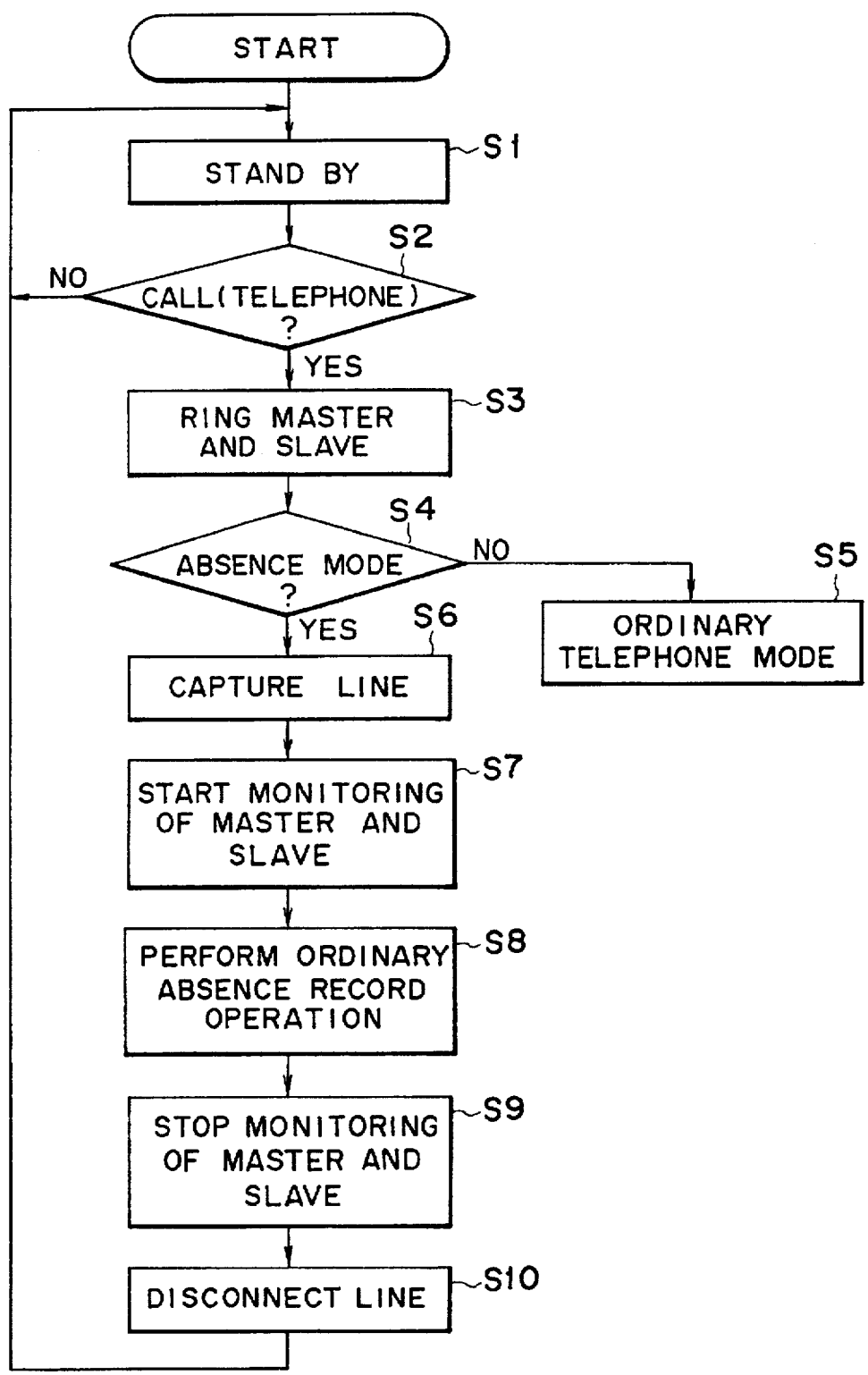
FIG. 4 is a flowchart of the second embodiment of the invention.

In the standby mode (step S1) shown in FIG. 4, if a telephone has been called (step S2), both of the master and slave units first ring (S3). The MPU 166 of the master 161 discriminates whether the absence mode has been set or not (S4). If YES, the line 102 is captured (S6). The MPU 166 of the master 161 starts to monitor the line 102 and sends the audio signal from the line 102 to the slave 267 through a radio line. The slave 267 receives the audio signal and starts to monitor the line 102 (S7). After that, the record unit 118 is controlled, thereby executing the absence recording operation (S8). After completion of the absence recording operation, the MPU 166 also finishes the monitoring of the master and slave (S9) and disconnects the line 102 (S10).

The slave generates a monitor sound from the receiver 219 or speaker 212.

In the embodiment, the absence recorded message can be also reproduced by the slave. A construction of the embodiment is common to FIG. 3.

When the operator depresses a play key in the operation unit 221 of the slave 267, the MPU 266 sends a reproduction command from the transmission unit 209. On the other hand, when the master 161 receives the reproduction command from the reception unit 110, the MPU 166 controls the record unit 118 and reproduces the absence recorded message and transmits from the transmission unit 109. The slave 267 receives the message from the reception unit 210 and generates a monitor sound from the receiver 219 or speaker 212.

As described above, according to the embodiment, by generating a monitor sound of the absence recorded message from the cordless slave, there is an effect such that the user can discriminate whether the content of the telephone which has received an originating call denotes a necessary telephone or an unnecessary telephone at any place.

Although the preferred embodiments have been described above, the invention is not limited to the foregoing embodiments but many modifications and variations are possible within the spirit and scope of the appended claims of the invention.

I claim:

1. A cordless communication system comprising a plurality of base units and a remote unit, wherein the plurality of base units include manual requesting means for generating registration requests in accordance with a manual operation at the plurality of base units, and transmit identification data in accordance with registration requests and call data including the identification data in accordance with generation of a call, and the remote unit receives and registers the identification data from the plurality of base units in a registration mode, and displays such that each of states of the plurality of the base units is distinguishable based on the identification data included in the call data from the plurality of base units and the registered identification data.

2. A system according to claim 1, wherein the remote unit receives the identification data as a radio signal.

3. A system according to claim 1, wherein the remote unit displays at least busy/idle states of the plurality of base units.

4. A system according to claim 1, wherein the remote unit has selecting means for selecting one of the plurality of base units.

* * * * *

UNITED STATES PATENT AND TRADEMARK OFFICE
CERTIFICATE OF CORRECTION

PATENT NO. : 5,687,218

DATED : November 11, 1997

INVENTOR(S): TORU NAKAYAMA

It is certified that error appears in the above-identified patent and that said Letters Patent is hereby corrected as shown below:

ON THE TITLE PAGE AT [57] ABSTRACT
  Line 8, "of" should read --or--.

COLUMN 1
  Line 32, "is" (2nd occurrence) should be deleted;
  Line 38, "another" should be deleted;
  Line 42, "another" should be deleted; and, "Of" should read --of--.

COLUMN 4
  Line 34, "include" should read --includes--.

Signed and Sealed this

Fourteenth Day of July, 1998

Attest:

BRUCE LEHMAN

*Attesting Officer*         *Commissioner of Patents and Trademarks*